United States Patent
Kish

(10) Patent No.: US 9,621,417 B2
(45) Date of Patent: Apr. 11, 2017

(54) AVOIDING ELECTRONIC-DEVICE IDENTIFICATION ERRORS

(71) Applicant: Ruckus Wireless, Inc., Sunnyvale, CA (US)

(72) Inventor: William S. Kish, Saratoga, CA (US)

(73) Assignee: Ruckus Wireless, Inc., Sunnyvale, CA (US)

( * ) Notice: Subject to any disclaimer, the term of this patent is extended or adjusted under 35 U.S.C. 154(b) by 113 days.

(21) Appl. No.: 14/502,926

(22) Filed: Sep. 30, 2014

(65) Prior Publication Data

US 2016/0094399 A1    Mar. 31, 2016

(51) Int. Cl.
*H04L 12/28* (2006.01)
*H04L 12/24* (2006.01)

(52) U.S. Cl.
CPC ................. *H04L 41/0806* (2013.01)

(58) Field of Classification Search
None
See application file for complete search history.

(56) References Cited

U.S. PATENT DOCUMENTS

| | | | | |
|---|---|---|---|---|
| 2004/0172535 A1* | 9/2004 | Jakobsson | ............ | G06Q 20/341 713/168 |
| 2013/0117559 A1* | 5/2013 | Bender | ................... | H04L 9/321 713/156 |
| 2013/0272224 A1* | 10/2013 | Ogawara | ............. | H04W 76/021 370/329 |
| 2013/0336306 A1* | 12/2013 | Sohn | ..................... | H04B 7/0877 370/338 |
| 2014/0351211 A1* | 11/2014 | Albouze | ........... | G06F 17/30174 707/624 |
| 2015/0030027 A1* | 1/2015 | Manzella | ............ | H04L 12/4641 370/392 |
| 2015/0063367 A1* | 3/2015 | Griswold | ............ | H04L 49/9063 370/412 |
| 2015/0350189 A1* | 12/2015 | Shin | ...................... | H04L 63/083 726/29 |
| 2015/0373762 A1* | 12/2015 | Raj | ..................... | H04W 76/023 370/329 |
| 2016/0044032 A1* | 2/2016 | Kim | .................... | H04L 63/0876 726/5 |

* cited by examiner

*Primary Examiner* — Phirin Sam
(74) *Attorney, Agent, or Firm* — Steven Stupp

(57) ABSTRACT

In order to increase the likelihood of possession of an electronic device (such as an access point), a modified identifier associated with the electronic device may be provided to another electronic device. In particular, the modified identifier may be generated by adding one or more additional characters to an identifier. For example, the identifier may include a serial number of the electronic device, and the one or more additional characters may include alphanumeric information and/or random numbers. These one or more additional characters may be: added to a beginning of the identifier, added to an end of the identifier, interspersed with characters in the identifier, and/or in a reserved field in the identifier. Moreover, the one or more additional characters may be predefined. Alternatively, the one or more additional characters may be dynamically generated.

20 Claims, 5 Drawing Sheets

AVOIDING ELECTRONIC-DEVICE IDENTIFICATION ERRORS

BACKGROUND

Field

The described embodiments relate to techniques for avoiding an error when identifying an electronic device based on a user-provided identifier for the electronic device.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard, which is sometimes referred to as Wi-Fi®, or Bluetooth from the Bluetooth Special Interest Group of Kirkland, Wash.), and/or another type of wireless network.

Moreover, electronic devices typically communicate with a wired network (such as the Internet) via access points in wireless local area networks. For example, an electronic device may access the Internet by wireless communication with an access point using Wi-Fi. In turn, multiple access points in one or more wireless local area networks may be associated with a local-area-network controller (which is sometimes referred to as a 'controller'), which is a centralized device (usually accessed via a wired network) that is aware of the environment(s) of the one or more wireless local area networks, including the presence of the multiple access points. Because of its centralized location and intelligence, a local-area-network controller can be used to: lower the cost of deployment, simplify the management of the access points and/or provide multiple layers of security.

Typically, access points are assigned or associated with corresponding local-area-network controllers based on identifiers of the access points. However, users often make errors when manually entering or providing such identifiers. These errors complicate the association between the access points and the correct corresponding local-area-network controllers.

SUMMARY

The described embodiments relate to an electronic device that includes an interface circuit that facilitates communication with another electronic device via a network. During operation, the electronic device obtains an identifier for the electronic device. Then, the electronic device generates a modified identifier for the electronic device by adding one or more additional characters to the identifier. Next, the electronic device provides the modified identifier to the other electronic device.

Note that the identifier may include a serial number of the electronic device. Moreover, the one or more additional characters may include: alphanumeric information and/or one or more random numbers. These one or more additional characters may be: added to a beginning of the identifier, added to an end of the identifier, interspersed with characters in the identifier, and/or in a reserved field in the identifier. In some embodiments, the one or more additional characters are predefined.

Furthermore, the electronic device may include an access point and the other electronic device may include a configuration device. Additionally, the electronic device may receive a network address for a cloud-based controller associated with the access point from the configuration device based on the identifier included in the modified identifier.

In some embodiments, the electronic device includes an integrated circuit that: obtains the identifier, generates the modified identifier, and provides the modified identifier. Alternatively or additionally, the electronic device includes: a processor; and memory, coupled to the processor, which stores a program module that is executed by the processor. This program module may include: instructions for obtaining the identifier; instructions for generating the modified identifier; and instructions for providing the identifier.

Another embodiment provides a computer-program product for use with the electronic device described previously. This computer-program product includes instructions for at least some of the operations performed by the electronic device.

Another embodiment provides a method for configuring the electronic device described previously. This method includes at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to increase the likelihood of possession of an electronic device (such as an access point), a modified identifier associated with the electronic device may be provided to another electronic device. In particular, the modified identifier may be generated by adding one or more additional characters to an identifier. For example, the identifier may include a serial number of the electronic device, and the one or more additional characters may include alphanumeric information and/or random numbers. These one or more additional characters may be: added to a beginning of the identifier, added to an end of the identifier, interspersed with characters in the identifier, and/or in a reserved field in the identifier. Moreover, the one or more additional characters may be predefined. Alternatively, the one or more additional characters may be dynamically generated.

By modifying the identifier, this security technique may allow errors in the identifier to be identified, such as when a user of the electronic device manually enters the identifier. In particular, the one or more additional characters may make it less likely that an error in the identifier results in a misidentification of the electronic device by the other electronic device. Alternatively, if an individual (other than the user) intentionally or inadvertently was allowed to provide the identifier without being required to provide the one or more additional characters, the other electronic device could incorrectly conclude that another individual (other than the user) was in possession of the electronic device. This may result in the other electronic device incorrectly providing sensitive information (such as configuration information for the electronic device of the individual). Consequently, this security technique may improve security associated with the electronic device, which may reduce the likelihood of errors or successful fraudulent acts. Therefore, the security technique may improve the user experience when using the electronic device.

In the discussion that follows, the electronic device may include a radio that communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi is used as an illustrative example. However, a wide variety of communication protocols may be used. In addition, an access point is used as an illustration of the electronic device, but in other embodiments a wide variety of electronic devices may be used.

Figure 1:
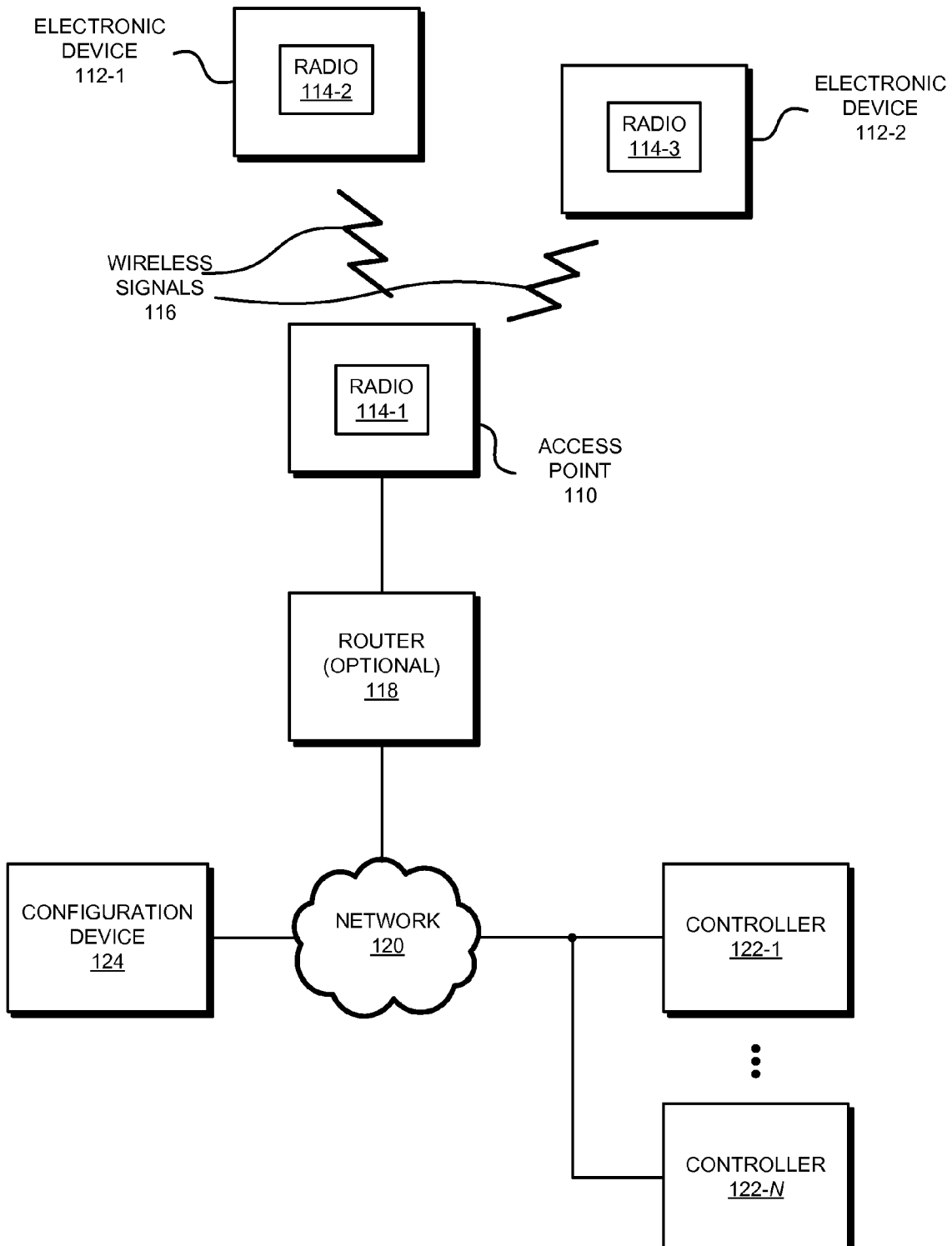
FIG. 1 is a block diagram illustrating electronic devices wirelessly communicating in accordance with an embodiment of the present disclosure.

Communication among electronic devices is shown in FIG. 1, which presents a block diagram illustrating access point 110 and one or more electronic devices 112 (such as portable electronic devices, e.g., cellular telephones) wirelessly communicating according to some embodiments. In particular, these electronic devices may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads).

Figure 5:
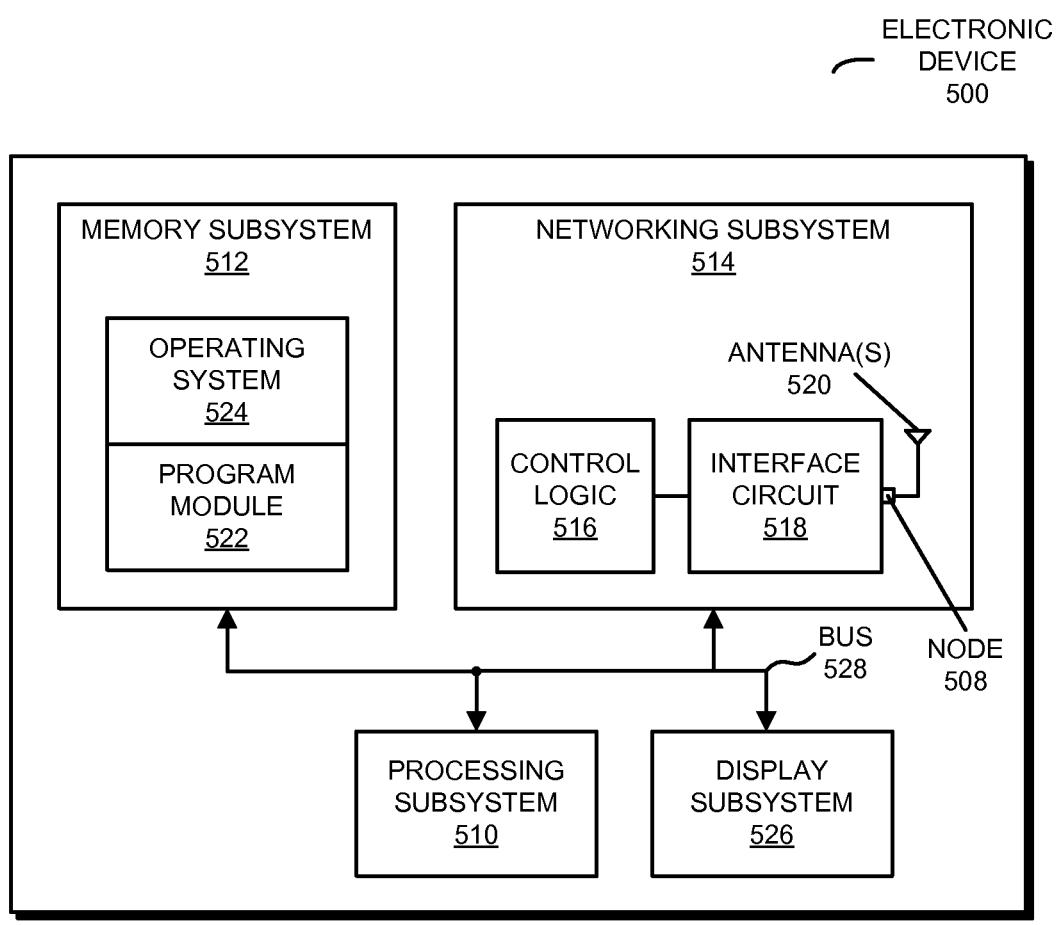
FIG. 5 is a block diagram illustrating one of the electronic devices of FIG. 1 in accordance with an embodiment of the present disclosure.

As described further below with reference to FIG. 5, access point 110 and the one or more electronic devices 112 may include subsystems, such as a networking subsystem, a memory subsystem and a processor subsystem. In addition, access point 110 and the one or more electronic devices 112 may include radios 114 in the networking subsystems. More generally, access point 110 and the one or more electronic devices 112 can include (or can be included within) any electronic devices with the networking subsystems that enable access point 110 and the one or more electronic devices 112 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc.

As can be seen in FIG. 1, wireless signals 116 (represented by jagged lines) are transmitted from a radio 114-1 in access point 110. These wireless signals 116 are received by radios 114 in at least one of the one or more electronic devices 112. In particular, access point 110 may transmit packets. In turn, these packets may be received by at least the one of the one or more electronic devices 112. This may allow access point 110 to communicate information to electronic devices 112. Note that the communication between access point 110 and a given one of electronic devices 112 (such as electronic device 112-1) may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In order to use access point 110, access point 110 may need to be configured when it is first installed at a particular location (which is sometimes referred to as a 'user location'). This configuration may include communication with configuration device 124 via optional router 118 and network 120 (such as the Internet). In particular, access point 110 may provide a controller query with an identifier for access point 110 (such as a serial number, a media access control address, a random or pseudorandom sequence known to access point 110, other sequences of alphanumeric characters, etc.) to configuration device 124. Based on the identifier, configuration device 124 may confirm the identity of access point 110 by associating the identifier with an existing user account. In addition, configuration device 124 may determine a controller associated with access point 110, and may provide a network address of this controller (such as a fully qualified domain name of the controller) to access point 110. This may allow access point 110 to be configured (such as for security purposes for access point 110) by communicating with the controller.

For example, there may be multiple controllers 122 that are, in principle, available. These controllers may be implemented on one or more servers that are accessed via network 120 (which are sometimes referred to as 'cloud-based controllers'). Moreover, controllers 122 may be associated with different providers (i.e., there may be multiple providers of controllers 122). While there is a predefined relationship between one of controllers 122 (such as controller 122-1) and access point 110, this relationship may not be initially known to access point 110. Instead, information (such as the network address) specifying controller 122-1 (which is associated with access point 110) may be provided to access point 110 by configuration device 124 based on a predefined mapping from the identifier to the network address (which may have previously been received from a third party who is other than the provider of access point 110 and a provider of controller 122-1, such as a distributor of access point 110, a service provider and/or a partner). Note that controller 122-1 may be associated with a provider or manufacturer of access point 110.

However, if a user of access point 110 makes a mistake (such as a typographical error) when manually entering the identifier, configuration device 124 may misidentify access point 110 and may associate it with the wrong one of controllers 122. Then, configuration device 124 may send the wrong network address to access point 110. Alternatively, if an individual (other than the user of access point 110) fraudulently provides the wrong identifier, configuration device 124 may associate the wrong one of controllers 122 with access point 110, and may send the wrong network address to access point 110. In this case, the individual may be able to remotely gain control of access point 110.

As discussed further below with reference to FIGS. 2-4, in the disclosed security technique the probability of misidentifying access point 110 or fraudulently attempting to gain control of access point 110 may be reduced. In particular, access point 110 may generate a modified identifier by adding one or more additional characters to the identifier. For example, the one or more additional characters may include: alphanumeric information and/or one or more random numbers. These one or more additional characters may be: added to a beginning of the identifier, added to an end of the identifier, interspersed with characters in the identifier, and/or in a reserved field in the identifier. In some embodiments, the one or more additional characters are predefined. Alternatively, access point 110 may dynamically generate the one or more additional characters, e.g., based on a seed value and a random-number or using a pseudorandom-number generator. After generating the modified identifier, access point 110 may provide it to configuration device 124 in the controller query.

In the described embodiments, processing a packet or frame in access point 110 and/or the one or more electronic devices 112 includes: receiving wireless signals 116 with the packet or frame; decoding/extracting the packet or frame from received wireless signals 116 to acquire the packet or frame; and processing the packet or frame to determine information contained in the packet or frame (such as feedback about the performance during the communication).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
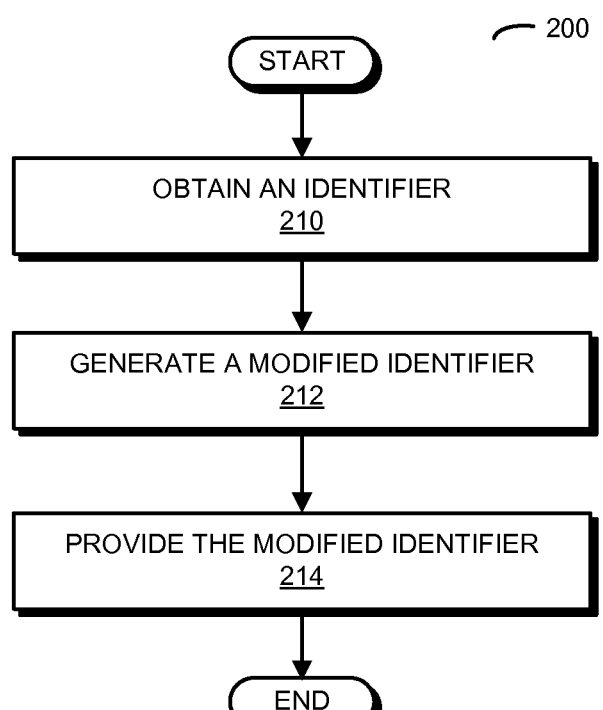
FIG. 2 is a flow diagram illustrating a method for providing a modified identifier in FIG. 1 in accordance with an embodiment of the present disclosure.
Figure 3:
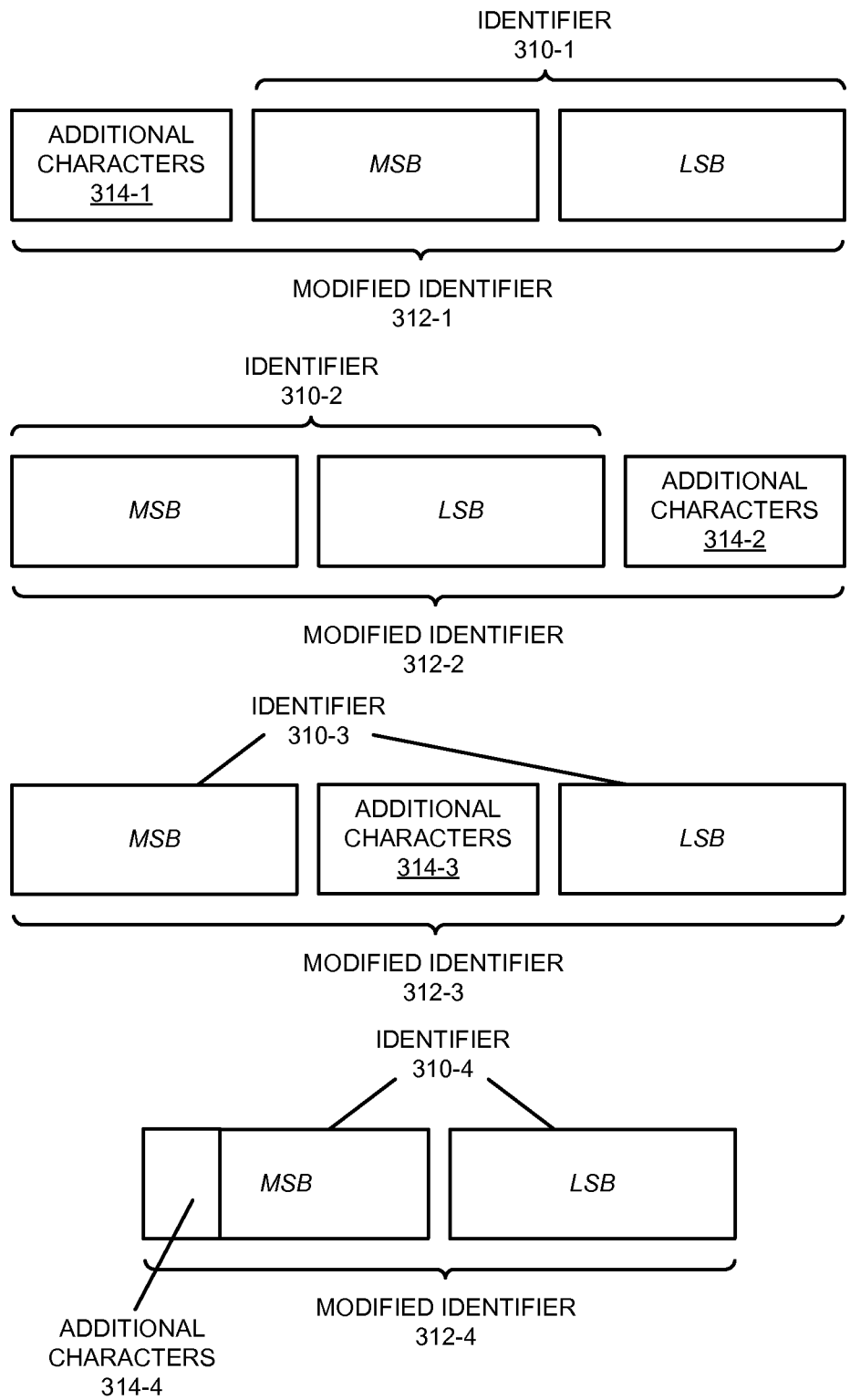
FIG. 3 is a drawing illustrating converting identifiers to modified identifiers for use in communication among the electronic devices in FIG. 1 in accordance with an embodiment of the present disclosure.

FIG. 2 presents embodiments of a flow diagram illustrating method 200 for modifying an identifier for an electronic device that may be performed by the electronic device (such as access point 110 in FIG. 1) according to some embodiments. During operation, the electronic device obtains an identifier (operation 210) of the electronic device. For example, the identifier may be stored in a computer-readable memory, and the electronic device may access the identifier. Alternatively, the identifier may be received from another electronic device (e.g., a computer), such as during manufacturing of the electronic device. Then, the electronic device generates a modified identifier (operation 212) of the electronic device by adding one or more additional characters to the identifier. Next, the electronic device provides the modified identifier (operation 214) to the other electronic device.

In these ways, the electronic device (for example, an interface circuit, a driver and/or software executed in an environment of the electronic device) may modify the identifier. This may allow more accurate identification of the electronic device. In embodiments where the electronic device is an access point, this may simplify the configuration of the access point and may reduce errors during the process, thereby improving the user experience when installing the access point.

In some embodiments of method 200 (FIG. 2), there may be additional or fewer operations. Moreover, the order of the operations may be changed, and/or two or more operations may be combined into a single operation. For example, instead of obtaining the identifier (operation 210) and generating the modified identifier (operation 212), these operations may have been performed previously and the modified generator may be predefined and stored in a computer-readable medium or memory in the electronic device.

In an exemplary embodiment, the electronic device adds a predefined random number (which may be defined when the electronic device is manufactured) to the identifier to generate the modified identifier. This is shown in FIG. 3, which presents a drawing illustrating converting identifiers 310 to modified identifiers 312 for use in communication between access point 110 and configuration device 124 in FIG. 1 according to some embodiments. For example, the modified identifiers may be generated by: adding one or more additional characters 314-1 prior to a most-significant byte (MSB) of identifier 310-1; adding one or more additional characters 314-2 after a least-significant byte (LSB) of identifier 310-2; and/or adding one or more additional characters 314-3 interspersed within identifier 310-3. In some embodiments, one or more additional characters 314-4 in modified identifier 312-4 are at existing locations within identifier 310-4, such as a reserved field in identifier 310-4. For example, random numbers may substitute for two digits in a serial number that are usually zero.

Note that the one or more additional characters may function like a PIN code. For example, the one or more additional characters may decrease the likelihood that an incorrect identifier will be misidentified. In particular, if the identifier includes twelve digits, then adding four additional numeric digits will decrease the probability that a random error or attempted fraud will result in a valid (but misidentified) modified identifier by a factor of 10,000. By adding more digits, the security of the modified identifier can be progressively increased at the cost of additional overhead.

In some embodiments, the modified identifier is printed on a barcode on an exterior of the electronic device. This may assist the user of the electronic device in manually entering the modified identifier or scanning the modified identifier during configuration of the electronic device (as described previously with reference to FIG. 1).

In an exemplary embodiment, a cloud-connected or cloud-based electronic device may need to be registered to a particular user or organization before it can be activated for service. For example, an access point may need to be associated with a cloud-based controller. Thus, the access point may need to be registered to a particular user or organization before it can be configured.

However, it can be difficult to ensure that the user only registers electronic devices that belong to them or that they have in their possession. An additional constraint in solving this problem is to avoid imposing additional actions or operations by entities in the supply chain or on the user, because these additional operations may not be practical or desirable.

A partial solution to this problem is to leverage the existing serial number or media access control address associated with the electronic device (which is often displayed on barcodes on the exterior of electronic device) so that the user can scan this information, e.g., using an application executing on a portable electronic device (such as a cellular telephone). Then, the portable electronic device may communicate the identifier to another electronic device, such as the configuration device. Alternatively, the user may manually enter the serial number or the media access control address. As noted previously, this approach is vulnerable to errors during the scanning or manual entry. In addition, it is also possible for malicious actors to generate arbitrary barcodes, which may reproduce the identifier on other electronic devices. Either of these scenarios may result in accidental or malicious misidentification or misregistration of the electronic device (including so-called 'device poaching').

These additional challenges may be prevented or the probabilities of occurrence may be decreased by adding one or more additional characters to the identifier to generate a modified identifier. For example, one or more digits may be reserved in the identifier for the electronic device. This reserved field may be randomized at the time of manufacture, e.g., its contents may include a random one or more digit number that is unrelated to the other digits in the serial number or the media access control address.

Consequently, the probability of misregistration may be diminished. In particular, for a two-digit randomized field within the serial number, the probability of misregistration may be reduced by a factor of 100. More generally, the probability of misregistration can be controlled by the number of random digits reserved for this purpose. Note that the randomized field may also assist in fraud detection, especially if the registrar has access to lists of valid (actually assigned) serial numbers or media access control addresses.

Figure 4:
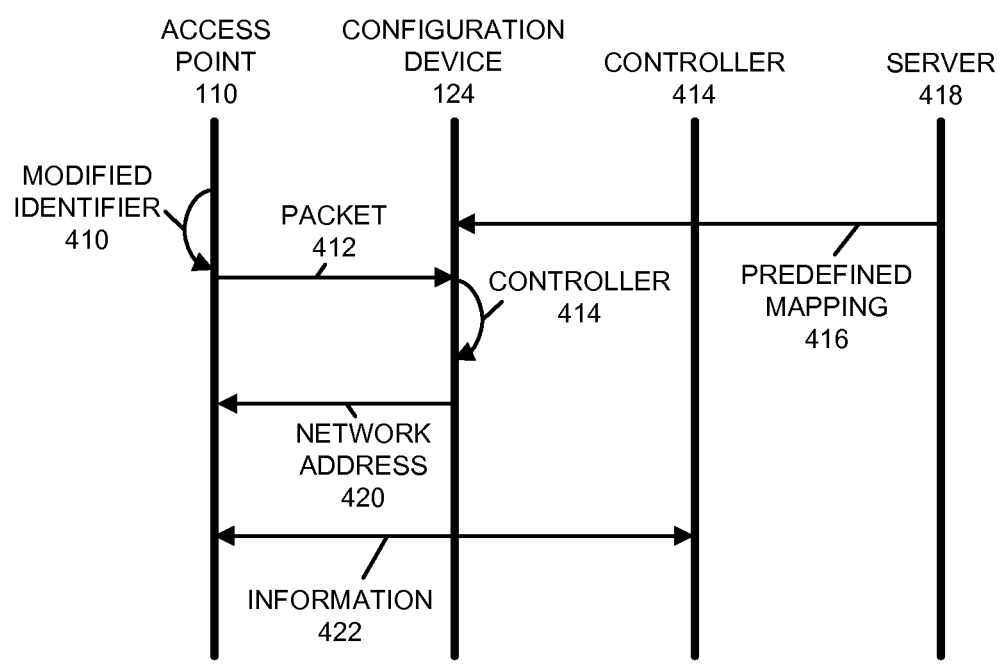
FIG. 4 is a drawing illustrating communication among the electronic devices in FIG. 1 in accordance with an embodiment of the present disclosure.

Embodiments of the security technique are further illustrated in FIG. 4, which presents a drawing illustrating communication between access point 110 and configuration device 124 according to some embodiments. In particular, access point 110 may generate a modified identifier 410 by adding one or more additional characters to the identifier. Then, access point 110 may provide a packet 412 with the controller query, which includes modified identifier 410. After receiving the controller query, configuration device 124 may identify a controller 414 based on modified identifier 410 using a predefined mapping 416 from modified identifier 410 to controller 414. This predefined mapping 416 may have been previously received from the third party, such as a server 418 operated by or on behalf of the third party.

Then, configuration device 124 provides, to access point 110, network address 420 of controller 414. Access point 110 may subsequently use network address 420 to communicate information 422 with controller 414 so that controller 414 can help configure access point 110.

We now describe embodiments of the electronic device. FIG. 5 presents a block diagram illustrating an electronic device 500 (such as access point 110 in FIG. 1) according to some embodiments. This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 522 or operating system 524), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

In addition, memory subsystem 512 can include mechanisms for controlling access to the memory. In some embodiments, memory subsystem 512 includes a memory hierarchy that comprises one or more caches coupled to a memory in electronic device 500. In some of these embodiments, one or more of the caches is located in processing subsystem 510.

In some embodiments, memory subsystem 512 is coupled to one or more high-capacity mass-storage devices (not shown). For example, memory subsystem 512 can be coupled to a magnetic or optical drive, a solid-state drive, or another type of mass-storage device. In these embodiments, memory subsystem 512 can be used by electronic device 500 as fast-access storage for often-used data, while the mass-storage device is used to store less frequently used data.

Networking subsystem 514 includes one or more devices configured to couple to and communicate on a wired and/or wireless network (i.e., to perform network operations), including: control logic 516, an interface circuit 518 and one or more antennas 520. (While FIG. 5 includes the one or more antennas 520, in some embodiments electronic device 500 includes one or more nodes, such as node 508, e.g., a pad, which can be coupled to the one or more antennas 520. Thus, electronic device 500 may or may not include the one or more antennas 520.) For example, networking subsystem 514 can include a Bluetooth networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 500 may use the mechanisms in networking subsystem 514 for performing simple wireless communication between the electronic devices, e.g., transmitting advertising or beacon frames and/or scanning for advertising frames transmitted by other electronic devices as described previously.

Within electronic device 500, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, electronic device 500 includes a display subsystem 526 for displaying information on a display, which may include a display driver and the display, such as a liquid-crystal display, a multi-touch touchscreen, etc.

Electronic device 500 can be (or can be included in) any electronic device with at least one network interface. For example, electronic device 500 can be (or can be included in): a desktop computer, a laptop computer, a subnotebook/netbook, a server, a tablet computer, a smartphone, a cellular telephone, a consumer-electronic device, a portable computing device, an access point, a controller, a router, a switch, communication equipment, test equipment, and/or another electronic device.

Although specific components are used to describe electronic device 500, in alternative embodiments, different components and/or subsystems may be present in electronic device 500. For example, electronic device 500 may include one or more additional processing subsystems 510, memory subsystems 512, networking subsystems 514, and/or display subsystems 526. Additionally, one or more of the subsystems may not be present in electronic device 500. Moreover, in some embodiments, electronic device 500 may include one or more additional subsystems that are not shown in FIG. 5. Also, although separate subsystems are shown in FIG. 5, in some embodiments, some or all of a given subsystem or component can be integrated into one or more of the other subsystems or component(s) in electronic device 500. For example, in some embodiments program module 522 is included in operating system 524.

Moreover, the circuits and components in electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as a radio. Moreover, the integrated circuit may include hardware and/or software mechanisms that are used for transmitting wireless signals from electronic device 500 and receiving signals at electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the described single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, calculating the throughput metric, etc.)

While a communication protocol compatible with Wi-Fi was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 522, operating system 524 (such as a driver for interface circuit 518), or in firmware in interface circuit 518. Alternatively or additionally, at least some of the operations in the communication technique may be implemented in a physical layer, such as hardware in interface circuit 518.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an interface circuit configured to communicate with another electronic device via a network, wherein the electronic device is configured to:
obtain an identifier for the electronic device;
generate a modified identifier for the electronic device by adding one or more additional characters to the identifier, wherein the one or more additional characters correctly identify the electronic device even when there is an error in the obtained identifier; and
wherein the one or more additional characters are associated with the electronic device; and
provide the modified identifier to the other electronic device.

2. The electronic device of claim 1, wherein the identifier includes a serial number of the electronic device.

3. The electronic device of claim 1, wherein the one or more additional characters include alphanumeric information.

4. The electronic device of claim 1, wherein the one or more additional characters are one of: added to a beginning of the identifier, added to an end of the identifier, interspersed with characters in the identifier, and in a reserved field in the identifier.

5. The electronic device of claim 1, wherein the one or more additional characters include random numbers.

6. The electronic device of claim 1, wherein the one or more additional characters are predefined.

7. The electronic device of claim 1, wherein the electronic device includes an access point and the other electronic device includes a configuration device.

8. The electronic device of claim 7, wherein the electronic device is further configured to receive a network address for a cloud-based controller associated with the access point from the configuration device based on the identifier included in the modified identifier.

9. The electronic device of claim 1, wherein the electronic device includes an integrated circuit configured to: obtain the identifier, generate the modified identifier, and provide the modified identifier.

10. The electronic device of claim 1, wherein the electronic device further comprises:
a processor; and
memory, coupled to the processor, which stores a program module configured to be executed by the processor, the program module including:
instructions for obtaining the identifier;
instructions for generating the modified identifier; and
instructions for providing the identifier.

11. A non-transitory computer-program product for use in conjunction with an electronic device, the computer-program product comprising a computer-readable storage medium configured to store software that, when executed by the electronic device, causes the electronic device to:
obtain an identifier for the electronic device;
generate a modified identifier for the electronic device by adding one or more additional characters to the identifier, wherein the one or more additional characters correctly identify the electronic device even when there is an error in the obtained identifier; and
wherein the one or more additional characters are associated with the electronic device; and
provide the modified identifier to the other electronic device.

12. The computer-program product of claim 11, wherein the identifier includes a serial number of the electronic device.

13. The computer-program product of claim 11, wherein the one or more additional characters include alphanumeric information.

14. The computer-program product of claim 11, wherein the one or more additional characters are one of: added to a beginning of the identifier, added to an end of the identifier, interspersed with characters in the identifier, and in a reserved field in the identifier.

15. The computer-program product of claim 11, wherein the one or more additional characters include random numbers.

16. The computer-program product of claim 11, wherein the one or more additional characters are predefined.

17. The computer-program product of claim 11, wherein the electronic device includes an access point and the other electronic device includes a configuration device; and
wherein, when executed by the electronic device, the software further causes the electronic device to receive a network address for a cloud-based controller associated with the access point from the configuration device based on the identifier included in the modified identifier.

18. A method for providing a modified identifier, wherein the method comprises:
obtaining an identifier for the electronic device;
generating the modified identifier for the electronic device by adding one or more additional characters to the identifier, wherein the one or more additional characters correctly identify the electronic device even when there is an error in the obtained identifier; and
wherein the one or more additional characters are associated with the electronic device; and
providing the modified identifier to the other electronic device.

19. The method of claim 18, wherein the identifier includes a serial number of the electronic device.

20. The method of claim 18, wherein the one or more additional characters are one of: added to a beginning of the identifier, added to an end of the identifier, interspersed with characters in the identifier, and in a reserved field in the identifier.

* * * * *